US005658421A

United States Patent [19]

Carroll

[11] Patent Number: 5,658,421

[45] Date of Patent: Aug. 19, 1997

[54] PUNCH AND REINFORCEMENT DEVICE

[76] Inventor: William Carroll, 12861 Western Ave., Unit A, Garden Grove, Calif. 92641-4164

[21] Appl. No.: 417,788

[22] Filed: Apr. 6, 1995

[51] Int. Cl.$^{6}$ .......... B32B 31/10

[52] U.S. Cl. .......... 156/513; 156/518; 226/96; 83/140; 83/686

[58] Field of Search .......... 83/140, 686; 226/96; 156/250, 251, 252, 261, 262, 263, 513, 518, 520, 521, 514

[56] References Cited

U.S. PATENT DOCUMENTS

| | | | |
|---|---|---|---|
| 2,228,372 | 1/1941 | Stuhlinger | 156/261 |
| 2,437,022 | 3/1948 | Fritzinger | 156/513 |
| 2,441,821 | 5/1948 | Kendall | 156/513 |
| 2,486,471 | 11/1949 | Fritzinger | 156/513 |
| 3,441,462 | 4/1969 | Bogen et al. | 156/513 |
| 3,457,815 | 7/1969 | Cahill | 156/513 |
| 4,826,561 | 5/1989 | Carroll | 156/518 |

*Primary Examiner*—W. L. Walker

*Attorney, Agent, or Firm*—Charles H. Thomas

[57] ABSTRACT

A combined hole puncher and reinforcer is provided with a punch control mechanism for detecting the presence of a flat sheet of material in registration with the punching device so as to provide a mechanical interlock for disabling the punching device in the absence of such a flat sheet in registration therewith, unless the adhesive tape feed mechanism is disabled. Also, a tape retainer or cover is hinged for rotation relative a mounting base and carries with it a depression finger and an idler roller. This not only provides clear access to the tape cavity, and enhances tractional engagement of the tape upon closure of the cover, but also avoids the necessity for threading the tape beneath an idler roller. The tape feed mechanism employs no gears, but utilizes a single ratchet wheel and pawl to advance the tape along its longitudinal path into registration with the punch and press assembly. Also, the blade assembly includes a lifting bar that provides a positive lifting force to elevate the severed end of the tape once the tape has been cut.

15 Claims, 11 Drawing Sheets

PUNCH AND REINFORCEMENT DEVICE

BACKGROUND OF THE INVENTION

1. Field of the Invention

The present invention relates to an improved hole punching and reinforcement device for positioning a length of adhesive tape over a flat sheet of material to be reinforced, punching a hole in both the tape and the sheet of material, and shearing off the punched length of tape.

2. Description of the Prior Art

One defect in many prior punch and reinforcement devices is that there is no safeguard to prevent operation of the device to both advance a length of tape and punch a hole therethrough in the absence of a sheet of material in registration with the punch. Thus, if the tape feed mechanism is left in the engaged condition and the punch is then operated without inserting a sheet of material to be reinforced into registration between the punch and the die, a section of tape at the end of the length of tape will be advanced in between the punch and the die, and pressed against the die. If no sheet of material to be punched has been inserted, the section of adhesive tape will thereupon be sheared off and remain adhesively secured to the die.

Lengths of tape so applied in the absence of a sheet of material become stacked and adhesively secured to each other, one atop of the other, so as to block the subsequent insertion of a sheet of material to be punched and reinforced. The device is then rendered inoperative until the layers of sheared sections of tape are removed from the die. This can only be accomplished by partial disassembly of the device and is a time consuming and annoying task.

My prior U.S. Pat. No. 4,826,561 describes a hole punching and reinforcing device which is operable to position a length of tape over a flat sheet of material, such as paper, and to punch a hole through both the length of tape and the paper while pressing the adhesive coated side of the tape against the paper and shearing off the length of tape from the roll of tape from which it is supplied. In an alternative mode that device is operable to punch a hole in a sheet of material without reinforcing it with tape.

In my prior U.S. Pat. No. 4,826,561 a pair of electrical switches were provided to prevent the operation of the device in the absence of a sheet of material inserted therein. The switches are actuated by the edge of the sheet of the material and generate electrical signals, both of which are necessary for the electrical actuation of the punching mechanism. However, this prior system requires an electrical power supply for its operation.

Also, in the hole punching and reinforcing device of my U.S. Pat. No. 4,826,561 a number of gears are employed to advance tape from a roll, and a clutch mechanism is provided with a selectively operable inhibiting stop that disengages the clutch mechanism. The stop is manually actuated to allow a user either to punch holes in sheets of material without reinforcing the area surrounding the holes with tape, or to advance tape under the control of the punching mechanism so that a length of tape is advanced and applied to the sheet of material with each operation of the punching mechanism.

While the prior device of U.S. Pat. No. 4,826,561 is quite effective in its operation, I have discovered that certain significant improvements can be made in such a device. Specifically, I have devised a system which eliminates the requirement for an electric power supply, yet still provides a safeguard to prevent tape from being fed into the die and pressed thereon unless a sheet of paper is present between the tape and the die.

A further disadvantage of my prior device, as well as other conventional hole punching and reinforcing devices, is the relative complexity of the tape feed mechanism. In prior conventional devices, such as that of U.S. Pat. No. 4,826,561, tape is fed from a roll of tape that is cradled in a base. To obtain tractional engagement of the sticky side of the tape with disks for advancing the tape, the free end of the tape must be threaded beneath an idler or guide roller that is mounted in the base and over a traction drive. The process for threading the free end of the tape beneath the roller is sometimes time consuming and difficult, since the sticky side of the tape will tend to cling to the structural parts of the base or fold back upon and cling to itself as it is pushed beneath the roller. Thus, there can be a considerable expenditure of time and waste of tape that occurs during the installation of each replacement roll of tape.

Another problem that occurs with prior conventional devices is that the adhesive from the passing tape builds up on the structures defining the path of travel of the tape over a period of time. This build-up of adhesive eventually is sufficient to impair the smooth movement of tape along its path of travel toward the punching mechanism. Furthermore, the multiple gear system employed in the puncher and reinforcer of U.S. Pat. No. 4,826,561 contributes significantly to the cost of manufacture of such a conventional hole punching and reinforcing device. Other defects exist in prior conventional hole punching and reinforcing devices as well.

SUMMARY OF THE INVENTION

One object of the present invention is to provide a hole punching and reinforcing device for punching and reinforcing flat sheets of material with a gravity operated, mechanical interlock that prevents the advancement of tape to the punching mechanism unless a flat sheet of material to be reinforced has been inserted into registration between the punch and the die through which the punch is forced. The hole punching and reinforcing device of the present invention is therefore entirely mechanical in operation and requires no source of electricity.

According to the present invention a punch control mechanism is provided that detects the presence of a flat sheet of material in registration with the punching device and provides a mechanical interlock for disabling the punching device in the absence of such a flat sheet in vertical registration with the punch and die unless the adhesive tape feed mechanism is disabled. Rather than requiring a relatively expensive electrical system for operation, the mechanical interlock provided by the present invention may conveniently take the form of a gravity operated latch.

The punch and reinforcement device of the invention employs a control for selectively allowing operation of the device alternatively as a punch and reinforcer, or as a punch only. When the control has been set to enable only the punching mechanism with the tape feed mechanism disabled, the gravity-operated latch does not inhibit operation of the punch. On the other hand, when the control is operated to engage the tape feed mechanism with the punch, insertion of a sheet of material to be punched in between the punch and the die lifts the latch so as not to obstruct movement of the punch. However, the punch cannot be operated and the tape feed mechanism will not advance tape unless a sheet of material to be reinforces resides in position between the punch and the die.

A related object of the invention is to provide a means for easily and consistently controlling the device either for operation to both punch and reinforce a sheet of material, or as a punch only. This control preferably takes the form of a slide switch which is moveable into a position that alternatively guides a pawl into engagement with the tape advancing ratchet wheel, or into an alternative path of movement in which the pawl does not engage the ratchet teeth of the tape advancement ratchet wheel.

When the pawl travels in the tape advancing ratchet engagement path, each time the punch operating lever is actuated the pawl engages a tooth of the ratchet wheel and advances the ratchet wheel so as to feed another section of tape into registration with the punch and die. However, as hereinbefore noted, the safety mechanical interlock disables the punching device in the absence of a flat sheet in registration between the punch and the die when the control mechanism has been set for both punching and reinforcement.

In its other position of actuation the control does not obstruct movement of the punch when adjusted to carry the pawl along the alternative path of movement in which it does not engage the ratchet teeth. This allows the punch to be actuated freely, so as to dislodge any circular disks from the end of the punch even though no sheet of material has been inserted in between the punch and the die as long as the tape feed mechanism has been disengaged.

Another object of the invention is to provide a tape feed system that does not require a gear system nor a multiplicity of sets of guide disks for operation. Likewise, the present invention does not employ any type of clutch mechanism. To the contrary, the construction of the device of the present invention has been simplified greatly for ease of construction and operation.

The tape feed mechanism of the invention has been simplified to require only a single set of feed roll disks which are advanced in rotation by a tape advancement ratchet wheel, a pawl that is operated by the punch operating lever, and an idler roller and depression finger carried on a hinged tape cavity cover. This construction is highly advantageous for several reasons. Because the idler roller and the tape depression finger are mounted on a hinged tape cavity cover, they are lifted clear of the tape cavity when the cover is opened. This allows a user to merely drop a roll of tape into the cavity, withdraw a length of tape from the roll, and press the adhesive coated underside of the exposed end of the tape into contact with the traction disks. There is no necessity to thread the tape beneath an idler roller. Also, access to the traction rollers is obstructed since both the idler roller and the depression finger are mounted on the underside of the tape cover and are lifted clear of the tape cavity when the cover is opened.

When the tape cavity cover is closed the depression finger and idler roller are brought into engagement with the uncoated, smooth, upper side of the tape so as to wrap the exposed end of the tape partially around the single set of traction disks. By wrapping the exposed end of the tape partially around the disks, sufficient traction is created so that as the single set of disks is rotated, tape can be drawn off of the roll. Furthermore, the construction of the traction drive assembly is such that it does not pick up adhesive from the tape advancing thereacross. As a consequence, the tape drive mechanism remains unclogged by residues of adhesive even when operated for prolonged periods of time.

A further object of the invention is to provide a hole punch and tape reinforcement system in which a positive, lifting action is applied against the underside of the sheared end of the tape remaining in the device once an adjacent section of tape has been severed therefrom and pressed against a sheet of material that has been punched and reinforced. By lifting the severed end of the tape from its underside, the end of the tape is raised upwardly to the top of the linear channel of tape travel and is therefore guided in a linear path that is located vertically above the plane of the next sheet of material to be inserted in between the punch and the die. Thus, with the next operation of the tape feed mechanism, the next section of tape is advanced in a linear path of travel in a plane parallel to, but vertically above the plane of the flat sheet of material to be reinforced. The tape therefore does not prematurely contact and stick to the sheet of material to be reinforced before it has been advanced fully into position above that sheet.

In one broad aspect the present invention may be considered to be an improved combination hole puncher and reinforcer that includes an adhesive tape feed mechanism for feeding a section of tape into aligned registration over an edge of a flat sheet of material to be punched, a punching device for punching an aperture through the section of tape and through the flat sheet, and a tape feed control mechanism for selectively enabling and disabling the adhesive tape feed mechanism. The improvement is comprised of a punch control mechanism for detecting the presence of a flat sheet of material in registration with the punching device and providing a mechanical interlock for disabling the punching device in the absence of such a flat sheet in registration therewith, unless the adhesive tape feed mechanism is disabled.

Preferably the punch control mechanism is comprised of a gravity operated latch which is lifted to allow operation of the punching device by the insertion of a flat sheet of material into registration with the punching device. The latch otherwise drops, under the force of gravity, to inhibit operation of the punching device when the tape feed control mechanism has enabled the adhesive tape feed mechanism.

Preferably also the combination of the invention is further comprised of a base and the adhesive tape feed mechanism resides within a cavity in the base and is comprised of a plurality of laterally separated traction drive disks. These traction drive disks are coaxially supported by the base for rotation relative thereto about a traction drive axis. A tape retainer is also provided and carries an idler roller and a depression finger. The tape retainer is hinged for rotation relative to the base and is moveable between open and closed positions.

In the opened or lifted position the tape retainer exposes the cavity to provide access for replenishing the adhesive tape. When the tape retainer is closed the idler roller and the depression finger bear downwardly against the upper, uncoated side of the adhesive tape on opposite sides of the traction drive axis, thereby wrapping the adhesive tape partially about the traction drive disks. The adhesive coated side of the tape is thereby pressed against the traction drive disks so as to enhance traction between the traction drive disks and the adhesive tape. This enhanced traction causes rotation of the drive disks to exert a sufficient longitudinal force along the length of the tape to break the underside of the withdrawn portion of the tape free from the remaining portion on the tape roll and allow it to be drawn along the path of tape travel through the device.

In another broad aspect the invention may be considered to be an improvement in a hole punching and reinforcing device in which a hole punching mechanism and adhesive tape feed mechanism are mounted on a base and are interconnected to feed adhesive tape having a sticky side coated with pressure sensitive adhesive and an opposite uncoated side. The adhesive tape is drawn from a roll of tape disposed in a tape supply cavity in the base. The adhesive tape is drawn into registration with the hole punching mechanism. The device is thereby operable to punch a flat sheet of material while reinforcing it with a length of the adhesive tape. The tape feed mechanism is comprised of a traction drive assembly including a plurality of coaxially mounted, laterally separated traction disks upon the edges of which the sticky side of the tape is tractionally engaged.

According to the improvement of the invention the tape feed mechanism is comprised of a tape advancing ratchet wheel coupled to rotate the traction disks in tandem. A pawl is coupled to the punching mechanism to advance the tape advancing ratchet wheel in a tape advancement direction of rotation. A cover over the tape supply cavity is hinged to the base. An idler roller is mounted on the hinged cover and the hinged cover is rotatable between open and closed positions. In the open position the hinged cover exposes the roll of tape and at least a portion of the traction disks to allow replenishment of the roll of tape. In the closed position the idler roller bears against the uncoated side of the tape to increase the extent of contact of the sticky side of the tape with the traction disks.

Preferably the tape feed mechanism is further comprised of a pair of guide disks that are laterally separated a distance greater than the width of the adhesive tape. The guide disks are coaxially mounted for rotation with the traction drive disks. The traction drive disks are located between the guide disks. The guide disks have a diameter greater than that of the traction disks and aid in constraining lateral movement of the tape and in directing the adhesive tape toward the hole punching mechanism.

Preferably the hole punching and reinforcement device also includes a tape feed control mechanism for selectively enabling and disabling the adhesive tape feed mechanism. This tape feed control mechanism includes a pawl spring that biases the pawl toward an engaged path of movement in which the pawl engages the tape advancing ratchet wheel and a switch mounted on the base for movement relative thereto. The switch is operable to overcome the bias of the pawl spring to thereby force the pawl toward a disengaged path of movement in which the pawl cannot engage the tape advancing ratchet wheel. Preferably, the switch is a slide switch mounted on the base for reciprocal movement relative thereto.

In still another broad aspect the invention may be considered to be an improvement in a hole punching and reinforcing device including a hole punching mechanism having a die defining a punching aperture therein and a punch reciprocally moveable through the punching aperture in the die in opposite punching and withdrawal directions. The device also includes an adhesive tape feed mechanism. The hole punching and adhesive tape feed mechanisms are interconnected to advance a section of a length of the adhesive tape so that the pressure sensitive adhesive thereon resides in registration facing the die with a flat sheet of material to be punched located between the sticky side of the adhesive tape and the die. A tape support faces the sticky side of the tape and is located adjacent the die and is separated therefrom by a gap defined between the die and the tape support. A blade is coupled to the punch to move through the gap to sever the section from the remainder of the length of adhesive tape when the punch moves in the punching direction.

According to the improvement of the invention in this aspect a lifting mechanism is coupled to the blade to lift the sticky side of the remainder of the tape away from the tape support as the punch moves in the withdrawal direction. Preferably the blade is formed as the upper edge of a window in a vertically oriented blade mechanism, and the lifting device is formed by the lower edge of the window in the blade mechanism. Thus, the severed end of the tape is thereby pushed vertically upwardly so as to reside at a level that is vertically above the plane of the sheet of material to be punched. As a result, when the next sheet of material to be punched and reinforced is inserted in between the punch and the die, the vertically elevated exposed end of the tape is pushed longitudinally forward into vertical alignment with the sheet of material next to be reinforced, but at a vertical distance thereabove. As a consequence the sticky side of the advancing length of the adhesive tape does not prematurely establish contact with the sheet of material to be-reinforced and thereby cling to the sheet of material before it has advanced the proper longitudinal distance.

In still another broad aspect the invention may be considered to be an improvement in a combination hole puncher and reinforcer including a punch mechanism and an adhesive tape feed mechanism for feeding a section of a length of tape having a sticky side coated with pressure sensitive adhesive and an opposite uncoated side into aligned registration over an edge of flat sheet of material to be punched and which includes a blade for severing the section of tape from the remainder of the length of tape, thereby leaving the remainder of the length of tape with a severed end. Such a device includes a punching device for punching an aperture through the section of the tape and the flat sheet. A tape feed control mechanism is provided for selectively enabling and disabling the adhesive tape feed mechanism. The improvement of the invention in this aspect resides in the provision of a device that backs the severed end of the tape away from the vertical plane of the blade when the tape feed control is operated to disable the adhesive tape advancement mechanism.

The invention may be described with greater clarity and particularity with reference to the accompanying drawings.

DESCRIPTION OF THE EMBODIMENT

Figure 1:
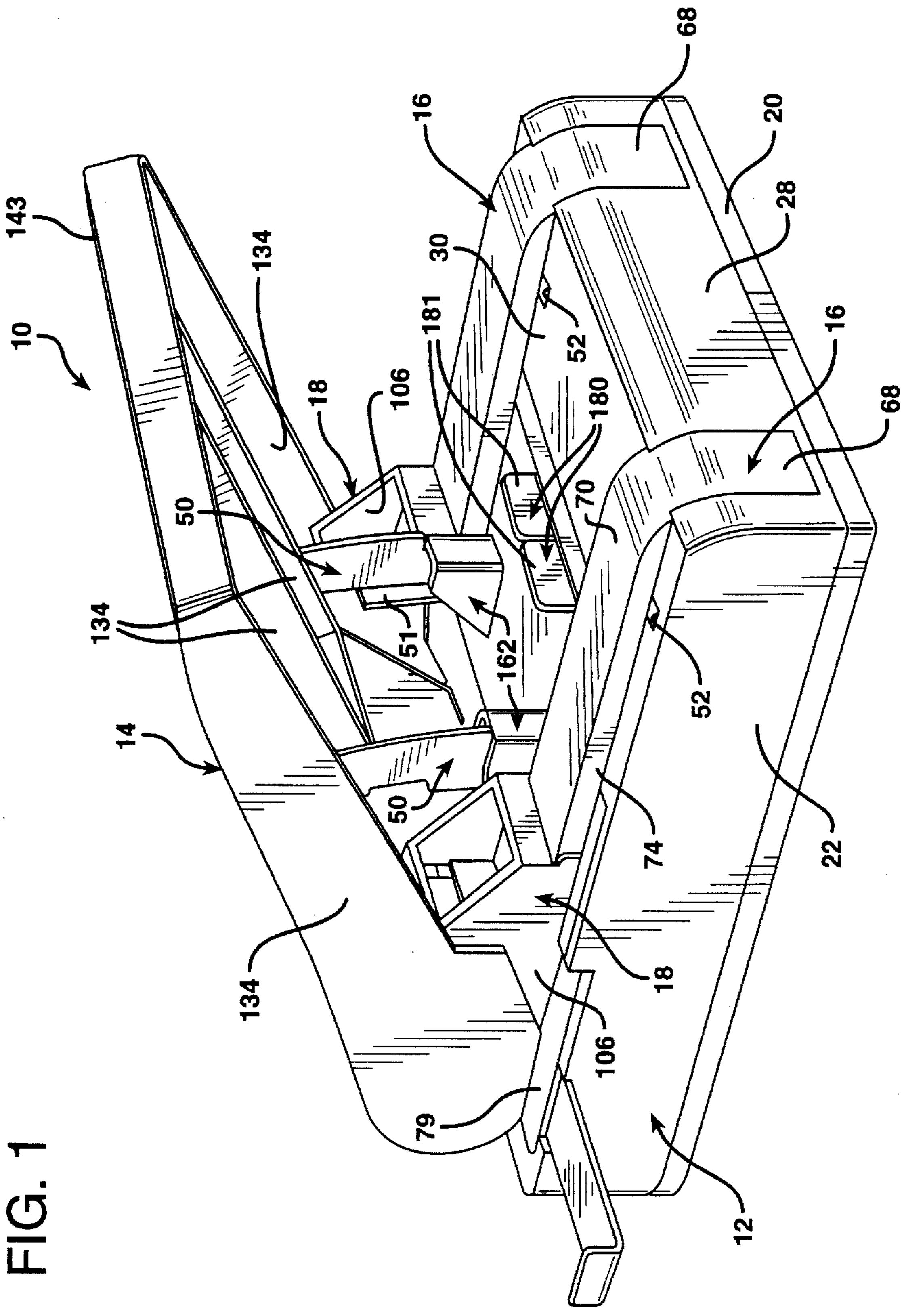
FIG. 1 is a perspective view of a preferred embodiment of an improved combination hole puncher and reinforcer according to the invention.
Figure 2:
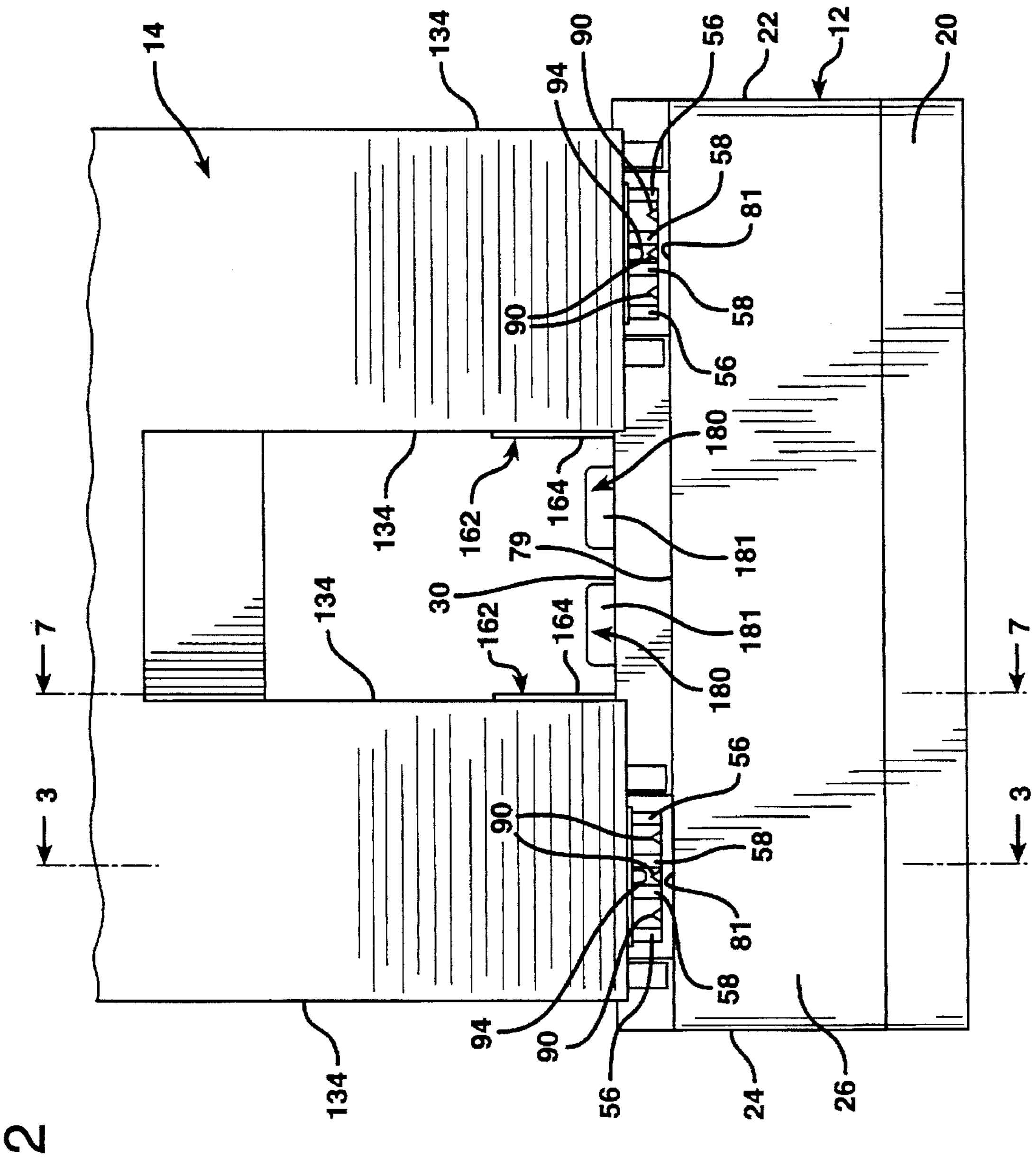
FIG. 2 is a front end elevational view of the hole puncher and reinforcer of FIG. 1.

FIG. 1 illustrates an improved combination hole puncher and reinforcer according to the invention indicated generally at 10. The puncher and reinforcer combination 10 is equipped with a mounting base indicated generally at 12, a punch operating lever 14 hinged to the base 12 about a transverse, horizontal axis of rotation at the front end thereof, and a pair of tape cavity covers 16 hinged to the mounting base 12 at the rear end thereof.

At its bottom the mounting base 12 includes a rectangular-shaped upwardly facing collection tray 20 which receives the disk-shaped punchings produced by the device. The mounting base 12 seats atop the collection tray 20 which is frictionally engaged therewith by means of conventional tangs (not visible) which project upwardly from the collection tray 20 and frictionally engage the inside surfaces of the side walls 22 and 24 of the mounting base 12.

The mounting base 12 is formed of a pair of parallel, longitudinally aligned outer sides 22 and 24 spaced laterally apart; a rectangular, transversely extending, upright, front end wall 26; a transversely extending, upright, rear end wall 28, and a flat, horizontally disposed rear deck surface 30. The rear end wall 28 is curved at its upper extremity at a transition to the rear deck 30. Forward of the rear deck 30 there is a flat, horizontal metal plate 79 on top of the base 12. The metal plate 79 defines a pair of laterally separated dies 81. The plate 79 is secured to the mounting base 12 by countersunken allen-head screws.

Within its structure the mounting base 12 forms various upright, longitudinally extending, interior partitions 32, 34, 36, and 38 and various transversely oriented, upright, interior partitions 40, 41, and 42. The mounting base 12 is preferably formed of a hard, durable, molded plastic.

On each of its sides and within its confines between the longitudinally extending partitions 32 and 34 the mounting base 12 defines a pair of tape supply cavities 44. The tape cavities 44 are laterally separated from each other and receive a pair of rolls 46 of adhesive tape therewithin. The rolls of adhesive tape 46 are conventional and are each formed with central openings therein of a standard size. A pair of identical plastic spools 48 are provided for mounting the rolls of tape 46 in the tape supply cavities 44. The spools 48 have an outer diameter which fits snugly into the central core openings of the tape rolls 46. The spools 48 are equipped with stub axles 50 that extend transversely outwardly in opposite directions.

The interior partitions 32, 34, 36, and 38 have transversely aligned, vertical grooves 52 defined therein to receive the stub axles 50 therewithin. The grooves 52 extend vertically downwardly from the deck 30 only part way down the partitions 32, 34, 36, and 38 so that the rolls of tape 46 are supported upon ledges at an intermediate level within the tape supply cavities 44.

A pair of traction drive assemblies 54 are supported for rotation within the mounting base 12 on each side of the mounting frame 12 in longitudinal alignment with the tape supply cavities 44. The traction drive assemblies 54 are each formed of a pair of laterally separated guide disks 56 and a pair of laterally separated traction disks 58 located between the guide disks 56. The disks 56 and 58 project radially outwardly from the cylindrical surface of a traction drive assembly spool 60.

The traction drive assemblies 54 are coaxially aligned with each other on opposite sides of the mounting base 12 along a common traction drive assembly axis indicated at 63. Each spool 60 has a central axial opening defined therethrough which receives a transversely oriented traction drive assembly axle 62 aligned on the axis 63. The traction drive assembly axle 62 extends through openings in the partitions 32–38 across the entire width of the base 12. The ends of the traction drive assembly axles 62 are mounted in sockets defined in the internally facing surfaces of the sides 22 and 24 of the base 12.

The cylindrical spool 60, the traction disks 58, and the guide disks 54 of each traction drive drive assembly 54 are formed of a unitary, molded plastic structure. In addition, the same molded plastic structure also forms a tape advancing ratchet wheel 59 having ratchet teeth 61 thereon and a second reversal restriction ratchet wheel 73 having ratchet teeth 75 thereon.

The tape advancing ratchet wheels 59 are smaller than the reversal restriction ratchet wheels 73 and are located further inboard toward the lateral center of the mounting body 12 than the ratchet wheels 73. Each tape advancing ratchet wheel 59 is disposed inboard and integrally formed with a ratchet wheel 73, which in turn is disposed inboard and integrally formed with the inboard guide disk 56 of each traction assembly 54 at the hub of rotation thereof. The ratchet teeth 61 are engagable to rotate the traction drive assembly 54 in a tape advancing direction, which is the counterclockwise direction as viewed in FIGS. 3 and 7, to draw tape 64 off the roll of tape 46.

Each tape advancement mechanism is also equipped with a spring metal strip 192 that is secured to the mounting base 12 by means of a screw 194 at one end and which terminates in a keeper pawl 196 at its free end. The spring strip 192 is spring biased toward the reversal restriction ratchet wheel 73 so that the keeper pawl 196 exerts a light force against the teeth 75 to inhibit retrograde, clockwise rotation of the reversal restriction ratchet wheel 73, and hence also of the entire traction drive assembly 54.

The traction disks 58 each have a uniform diameter less than that of the guide disks 56. The traction disks 58 contact and support the sticky side of a length of tape 64 that is initially unwound from each roll of tape 46. The length of tape 64 extends linearly over the outer curved surfaces of the traction disks 58 and is laterally constrained therebetween by the guide disks 56.

The rotatable tape cavity covers 16 are of a generally L-shaped configuration and have opposing mounting arms 68 and longitudinally projecting roof portions 70. The moveable tape cavity covers 16 are independently hinged to the mounting base 12 on the laterally opposite sides thereof by means of openings defined in the mounting arms 68 that receive mounting studs 66 that project inwardly into both the tape supply cavities 44 from both sides thereof from the interior partitions 32, 34, 36, and 38.

Each of the roof portions 70 of the tape cavity covers 16 has a pair of laterally separated, longitudinally extending side walls 72 projecting downwardly therefrom. The side walls 72 carry mounting ears 74 that are oriented perpendicular to the roof portions 70. A metal axle pin 76 extends between the mounting ears 74 within the confines of the side walls 72 of each of the rotatable tape cavity covers 16. A plastic idler roller 78 is rotatably mounted upon each axle pin 76.

Each of the roof portions 70 of each tape cavity cover 16 also carries a resilient metal tape depression finger 80 that is secured at one end to the underside of the roof portion 70. Each tape depression finger 80 has a distal free end that extends in a arcuate curve conforming to the curvature of the traction disks 58. The tip 82 of each depression finger 80 is bent back from the adjoining portion curved to match the curvature of the traction disks 58 to project radially outwardly back toward the roof portion 70 as illustrated.

At its free extremity each roof portion 70 also defines a detent latching tang 84 that is releasably engagable with the transversely extending, upwardly inclined underside 86 of the punch mounting brackets 18 hereinafter to be described.

Figure 3:
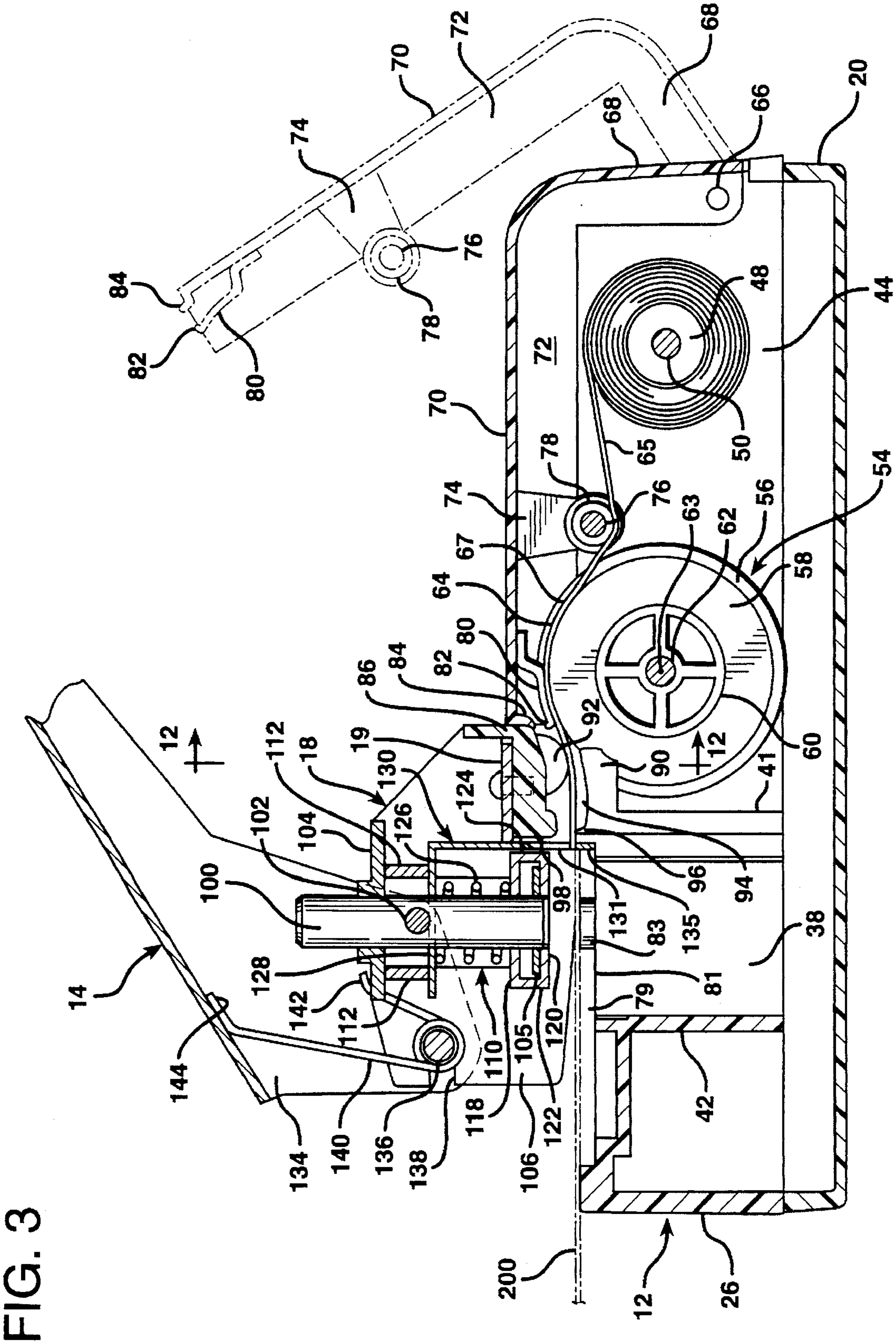
FIG. 3 is a sectional elevational view taken along the lines 3—3 of FIG. 2 showing the punch in the fully withdrawn position and showing the hinged cover in an open condition.

When the tape cavity covers 16 are opened, as illustrated in FIG. 3, the roof portions 70 thereof are swung entirely clear of the tape supply cavities 44. Since the depression fingers 80 and the idler rollers 78 are mounted on the roof portions 70 of the tape cavity covers 16, movement of a tape cavity cover 16 into an open position depicted in FIG. 3 fully exposes the tape cavity 46 and exposes a major portion of the traction drive assembly 54 longitudinally aligned therewith. Thus, a user is able to remove a spent tape roll core and insert a new roll of tape 46 without obstruction.

A length of tape 64 is merely pulled off of the remaining portion of the tape wound on the tape roll 46 and stretched longitudinally and pressed against the outer surfaces of the traction disks 58 forwardly beyond the traction drive axle 62. Thus, when the tape cavity cover 16 is returned to its closed position, the depression finger 80 urges the end extremity of the length of tape 64 that extends forwardly beyond the traction drive assembly axle 62 into contact with the traction guide disks 58. At the same time the idler roller 78 urges the portion of the tape 64 that lies longitudinally to the rear of the traction drive axle 62 into contact with the outer curved portions of the traction disks 58 as well. Together, under the influence of the tape depression finger 80 and the idler roller 78 the length of tape 64 is brought into contact with the traction disks 58 over an arc of at least about 30 degrees.

Figure 4:
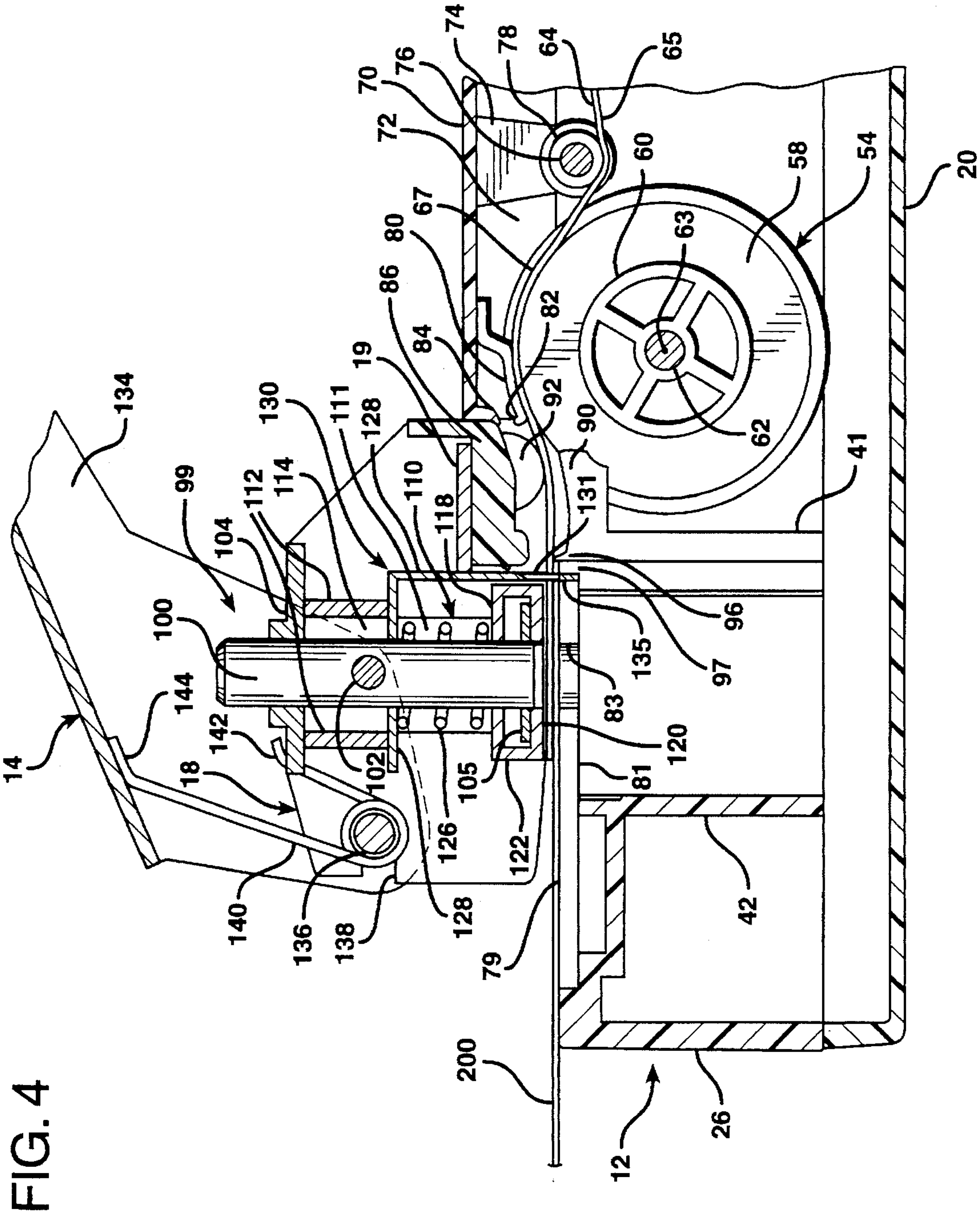
FIG. 4 is a sectional elevational detail of a portion the combination hole puncher and reinforcer of FIG. 1 showing the punch advancing in the punching direction and showing the hinged cover in a closed condition.
Figure 5:
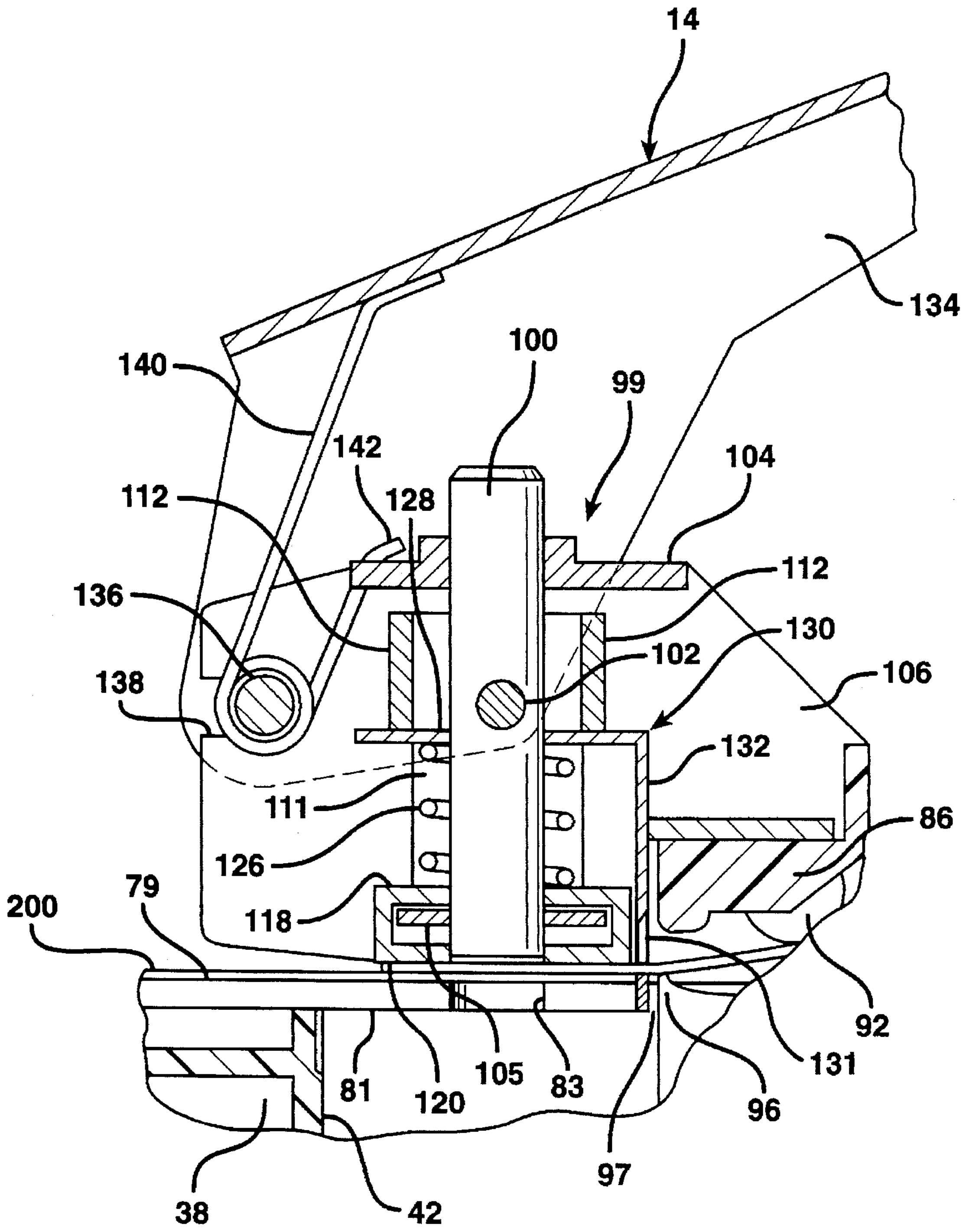
FIG. 5 is an enlarged sectional elevational detail of a portion of the combination hole puncher and reinforcer shown in FIG. 4 with the punch further advanced in the punching direction.
Figure 6:
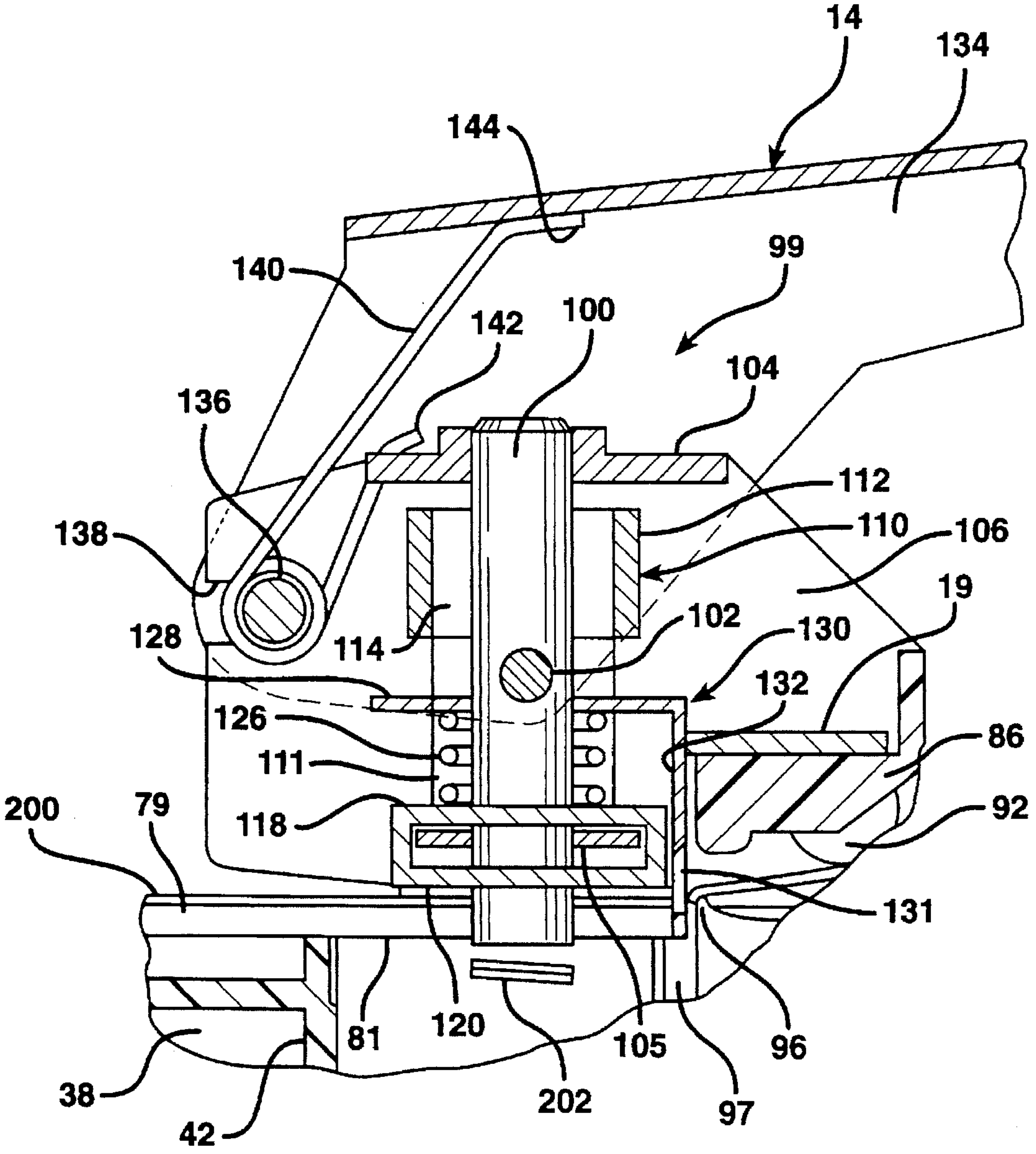
FIG. 6 is an enlarged elevational sectional detail of the mechanism shown in FIG. 5 with the punch fully advanced in the punching direction.

The tape on the roll of tape 46 has a sticky underside 65 that is coated with a pressure sensitive adhesive and an opposite, smooth, uncoated outer side 67. When the tape cavity covers 16 are closed, as illustrated in FIG. 4, the detent latching tangs 84 engage the inclined surfaces 86 of the punch mounting brackets 18 so that the idler rollers 78 bear against the lengths of tape 64 on the uncoated sides 67 thereof between the tape rolls 46 and the traction drive assemblies 54. The depression fingers 80 of the tape cavity covers 16 bear against the tape 64 on the uncoated side 67 thereof beyond the traction drive assembly axle 62. Together, the tape depression fingers 80 and the idler rollers 78 force the sticky sides 65 of the tape 64 against the outer edges of the traction disks 58 over arcuate portions of the circumferences of the traction disks 58. The arcuate extent of contact is great enough to thereby enhance the traction between the traction disks 58 and the sticky side 65 of the lengths of tape 64.

Longitudinally forwardly of the traction drive assembly axle 62 the mounting base 12 defines a transversely oriented, interior partition 41 from which three rearwardly and slightly upwardly inclined tape peeling fingers 90 project in between the interstitial spaces defined between the traction disks 58 and the guide disks 56 in each of the tape cavities 44. The guide fingers 90 are mounted on the base 12 beneath the sticky side 65 of the length of tape 64 and longitudinally forwardly beyond the traction drive assembly axle 62 so as to deflect the tape 64 from the traction disks 58 into the linear channel 94. As the tape is advanced and reaches the peeling fingers 90, the fingers 90 serve to peel the tape 64 off of the outer surfaces of the traction disks 58. The length of tape 64 is guided longitudinally forwardly along the upper surfaces of the fingers 90 by a downwardly depending flange 92 that extends from the underside of the transverse inclined surface 86 of the mounting platform 19 on each of the punch mounting brackets 18.

The area between the underside 86 of each mounting platform 19 and the upper surfaces of the peeling fingers 90 defines a generally linear channel of tape travel indicated at 94. Each channel 94 is bounded at its rearward end by the upturned extremities of the tips of the peeling fingers 90 and a downwardly projecting flange 92 and at its longitudinally forward end by the upwardly projecting extremity 96 that forms a tape support on the forward side of the partition 41 and the transversely facing forward edge 98 of the mounting platform 19 of each punch mounting bracket 18.

The puncher and reinforcer 10 includes a pair of punch assemblies 99 that include vertically oriented, generally cylindrical steel punches 100. Each of the punches 100 is mounted for vertical reciprocal movement in one of the punch mounting brackets 18. The punches 100 are thereby mounted on the mounting base 12 by means of the punch mounting brackets 18 for reciprocal movement relative thereto in a vertically downward punching direction and in a opposite, vertically upward return direction along paths of punch travel that intersect the linear channels of travel 94 of the lengths of tape 64.

The punches 100 are mounted in transverse separation from each other on opposite sides of the mounting body 12. Each of the punches 100 has a transverse bore therethrough through which a horizontally disposed, transversely aligned punch carriage rod 102 extends. Each of the punches 100 extends vertically upwardly through vertically aligned openings in the upper and lower punch guide platforms 104 and 105 that extend transversely between the vertical, longitudinally aligned side walls 106 of each of the punch mounting brackets 18.

Each of the punch mounting bracket walls 106 has a vertically oriented slot 107 defined therein. The slots 107 extend from the upper punch guide platforms 104 about half way down the bracket walls 106. The punch carriage rods 102 that extend transversely through the punches 100 project through the vertical guide slots 107 defined in the bracket walls 106.

Within the lateral confines of the interior surfaces of the side walls 106 of each of the brackets 18 there is a pressure plate carriage 110 having opposing, longitudinally oriented, transversely spaced apart sides 111, the upper extremities of which are shaped as upright, inwardly facing channels having transversely extending ears 112 and a longitudinally extending web 114 therebetween. Vertically extending, elongated slots 115, closed at both their upper and lower extremities, are defined in the webs 114 of the channel-shaped pressure plate carriages 110. The slots 115 in the webs 114 are closed at both their upper and lower ends. The upper ends of the slots 115 terminate about a quarter of an inch from the upper extremities of the pressure plate carriages 110.

The vertically oriented slots in the webs 114 are transversely aligned with each other and with the slots 107 in the punch bracket side walls 106, so that the punch carriage rods 102 extend transversely through the punches 100, outwardly through the slots 115 in the webs 114 of the pressure plate carriages 110, and through the open ended slots 107 in the bracket side walls 106. The ends of the punch carriage rods are engaged with the operating lever 14 of the puncher and reinforcer 10.

Beneath their channel-shaped upper portions the sides 111 of the pressure plate carriages 110 extend downwardly as flat, longitudinally aligned plates. The pressure plate carriage sides 111 are transversely spaced apart on opposite sides of the punches 100. At the lower extremities of the sides 111 the pressure plate carriages 110 are formed with open ended box-like structures including a horizontally disposed, spring-bearing plate 118 that resides above the lower punch guide platform 105 and a horizontally disposed pressure plate 120 residing beneath the platform 105. The horizontal plates 118 and 120 are joined together fore and aft by transversely extending, vertically oriented webs 122 and 124.

The horizontal plates 118 and 120 are separated from each other a vertical distance greater than the height of the lower punch guide platform 105 above the die 81 located therebeneath. Each die 81 has an opening 83 therethrough vertically aligned with one of the punches 100 and of a diameter that allows passage of the punch 100 therethrough.

A compressed coil spring 126 is disposed coaxially about the punch 100 in each of the punch assemblies 99. At their lower ends the springs 126 bear downwardly against the bearing plate 118, while at their upper ends the springs 126 bear against the horizontally disposed blade flange 128 of a blade assembly 130. The blade flange 128 has a vertically oriented aperture 129 therethrough through which the punch 100 extends.

The blade flange 128 of each blade assembly 130 extends horizontally rearwardly where it terminates at a transversely extending, vertically oriented blade plate 132. The blade plate 132 is a thin, upright metal plate which has a rectangular window 131 defined therethrough. The top edge 133 of the window 131 is sharpened to form a cutting blade for severing an end section from the length of the tape 64. The upper edge 133 of the rectangular window 131 is inclined forwardly and downwardly toward the die 81.

The lower edge of the window 131 lifts the severed end of the length of tape 64 above the level of the die 81 and above the level of a sheet of material to be reinforced and/or punched which rests atop the metal plate 79 when the punch 100 withdraws vertically upwardly from the die 81. A tape lifting member or means 135 is thereby formed by the lower portion of the blade plate 132 beneath the rectangular window 131 therethrough. The tape 164 passes longitudinally through the window opening 131 in the blade plate 132. Since the lifting member 135 is formed as part of the blade plate 132, it is coupled to the blade 133 for movement therewith to bear upwardly against the sticky side 65 of the severed tip of the length of tape 64 during movement of the punch 100 in the vertically upward, return direction.

The punch operating lever 14 extends transversely across the width of the mounting base 12 so as to operate both punch assemblies 99 in tandem. The punch operating lever 14 includes two pairs of downwardly depending, vertically aligned, longitudinally oriented mounting ears 134. The mounting ears 134 of the punch operating lever 14 are rotatably joined to the punch mounting bracket walls 106 of the punch mounting brackets 18 forward of the punches 100 by means of two punch lever axles 136, as best illustrated in FIG. 3. The punch lever axles 136 are separately seated in each of the punch mounting brackets 18 in rearwardly extending slots 138 defined in the forward edges of the punch mounting bracket walls 106.

Transversely aligned torsion springs 140 are disposed about each of the punch lever axles 136. One end 142 of each of the springs 140 bears against the upper surface of one of the upper mounting bracket platforms 104 while the opposite end 144 of each of the springs 140 bears against the underside of the punch operating lever 14. The punch operating lever 14 is thereby biased toward its raised position depicted in FIG. 3 by the action of the springs 140.

Figure 9:
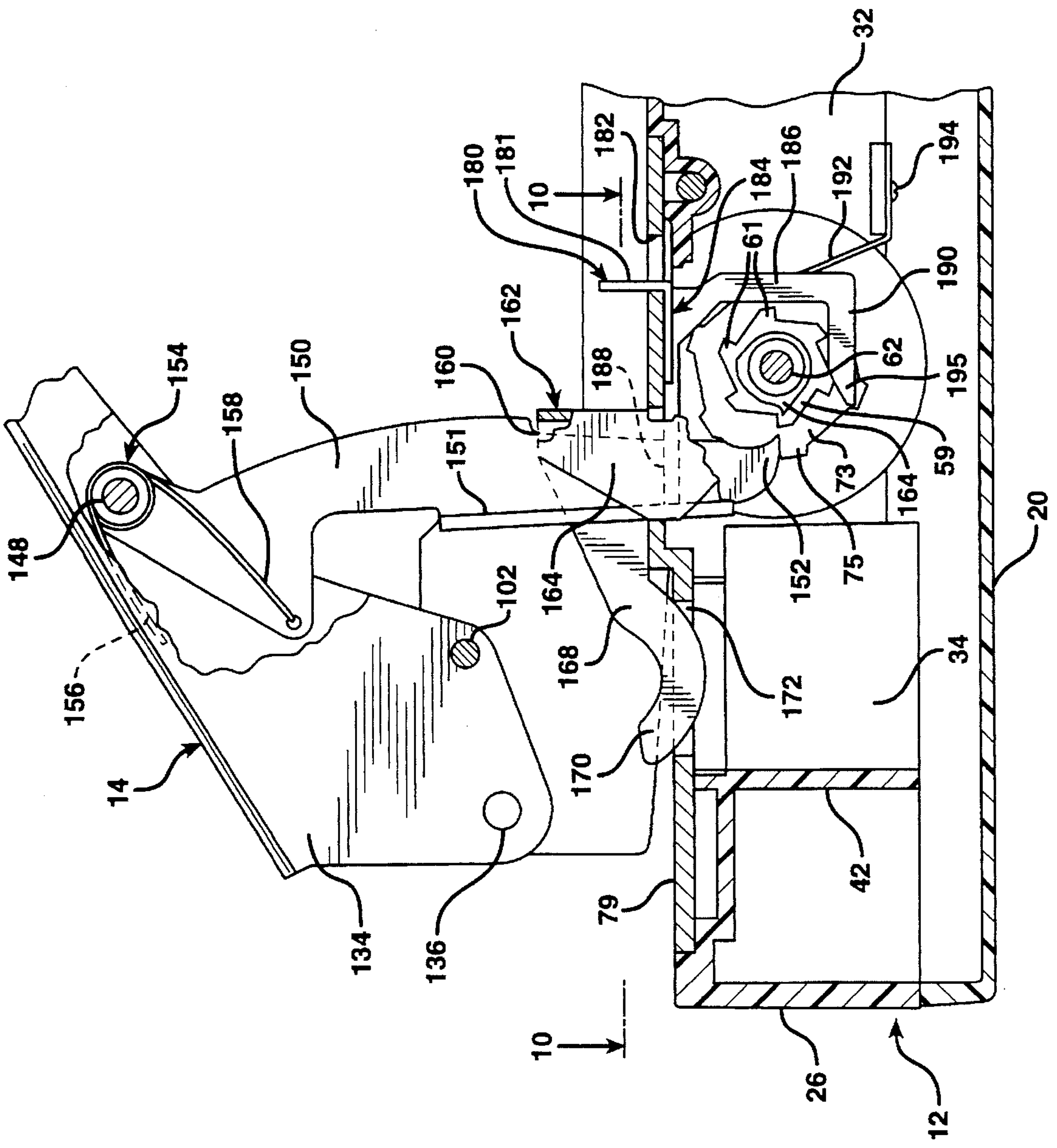
FIG. 9 is a side elevational view of a portion of the puncher and reinforcer shown in FIG. 7 set to operate in the punch only made.

The ends of the transverse punch operating rods 102 extend into and are rotatable relative to circular sockets defined in the inside mutually facing surfaces of each of the mounting ears 134, as illustrated in FIG. 9. Therefore, a downward force on the upper free extremity 143 of the punch operating lever 14 overcomes the forces of the springs 140 and causes the punch operating lever 14 to rotate in a clockwise direction about the axles 136, as viewed in FIGS. 3, 7, and 9. This movement forces the punches 100 downwardly, overcoming the biases of the springs 126.

The dies 81 formed in the metal plate 79 ace located vertically below the linear channels of tape travel 94 and are oriented normal to the punches 100. The dies 81 have openings 83 therethrough that are coaxially aligned with the punches 100. The punches 100 pass through die openings 83 as they are reciprocally operated by the punch operating lever 14.

Since the springs 126 force the blade flanges 128 upwardly against the underside of the transverse rods 102, the blade assemblies 130 are thereby engaged with their respective punches 100 for reciprocal movement therewith. The blade plates 132 are transversely oriented relative to the linear channels 94 of tape travel. The blade plates 132 are located longitudinally between the dies 81 and the tape supports 96 and move vertically in the gaps 97 therebetween through the linear channels. 94 of tape travel.

Upwardly and rearwardly of the hinged connection of the punch operating rods 102 to the mounting ears 134 the punch operating lever 14 carries a pair of horizontally oriented, transversely aligned pawl guide axles 148, visible in FIG. 9. The pawl guide axles 148 extend transversely between and are secured to the pairs of punch operating lever mounting ears 134.

Inboard from each of the punch mounting brackets 18 there is a vertically oriented, longitudinally disposed pawl 150. Each of the pawls 150 is formed by an arcuately-shaped, elongated, longitudinally aligned plate, the forward edge of a portion of which is turned laterally or transversely inwardly to form a laterally centering bearing flange 151. Each pawl 150 is hinged at its upper extremity to the punch operating lever 14. Each pawl 150 is coupled to the punch operating lever 14 by its associated pawl mounting axle 148. The lower extremity of each pawl 150 terminates in a rearwardly directed finger 152 that is guided into engagement with the teeth 61 of the tape advancing ratchet wheel 59 when the punch and reinforcer 10 is operated in both the punching and the reinforcement mode. Each of the pawls 150 includes along its rear, curved surface a notch 160. The pawl plate 150 is wider as measured in a longitudinal direction above the notch 160 than it is beneath the notch 160.

The pawl 150 is biased rearwardly, and urged toward counterclockwise rotation, as viewed in FIGS. 3 through 9, by the wire torsion springs 154 that are disposed coaxially about the pawl mounting axles 148. An upper end 156 of each of the wire springs 154 bears against the underside of the punch operating lever 14, while the lower end 158 of each wire spring 154 is engaged in a opening in the pawl plate 150. As a result, the springs 154 urge the pawls 150 rearwardly and in a counterclockwise direction as viewed in FIGS. 3–9.

Figure 10:
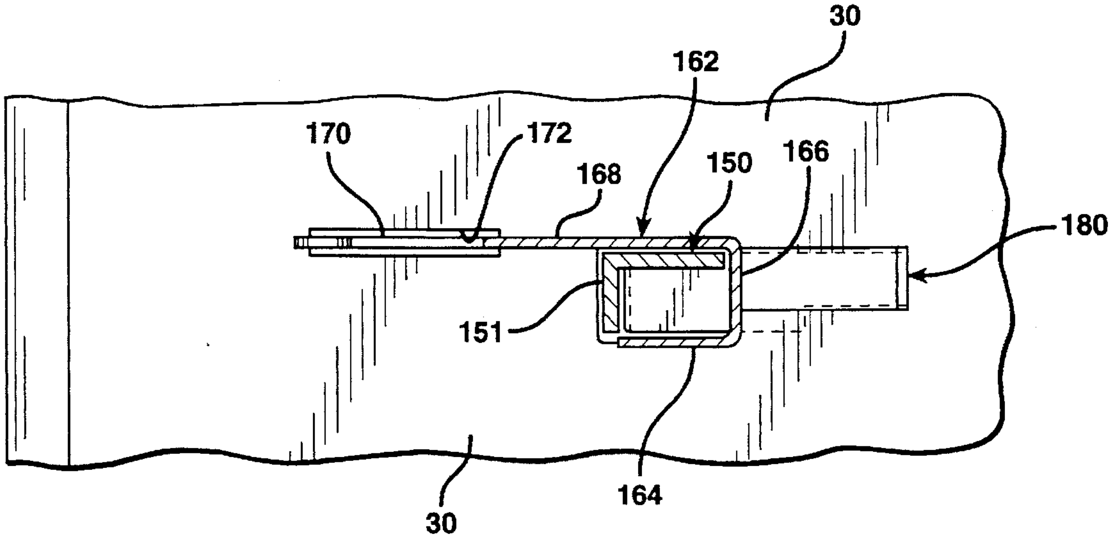
FIG. 10 is a top plan detail taken along the lines 10—10 in FIG. 9.

A pawl interlock and guide 162 is mounted on each side of the mounting base 12 inboard of the punch mounting brackets 18 and to the rear of the dies 81. The pawl interlock and guides 162 are each formed of steel plates. Each pawl interlock and guide 162 has an elongated, longitudinally oriented, vertically disposed hinge plate arm 164 that is mounted for free rotation about the traction drive assembly axle 62. The pawl guide hinge plate arms 164 extend upwardly through rectangular openings formed in the mounting base deck 30, as shown in FIG. 10, where they are bent laterally outwardly to form transverse pawl interlock webs 166. From the transverse interlock webs 166 the metal plates forming the pawl interlock and guides 162 are bent again to form forwardly extending, longitudinally aligned, vertically disposed sensor arms 168.

Figure 7:
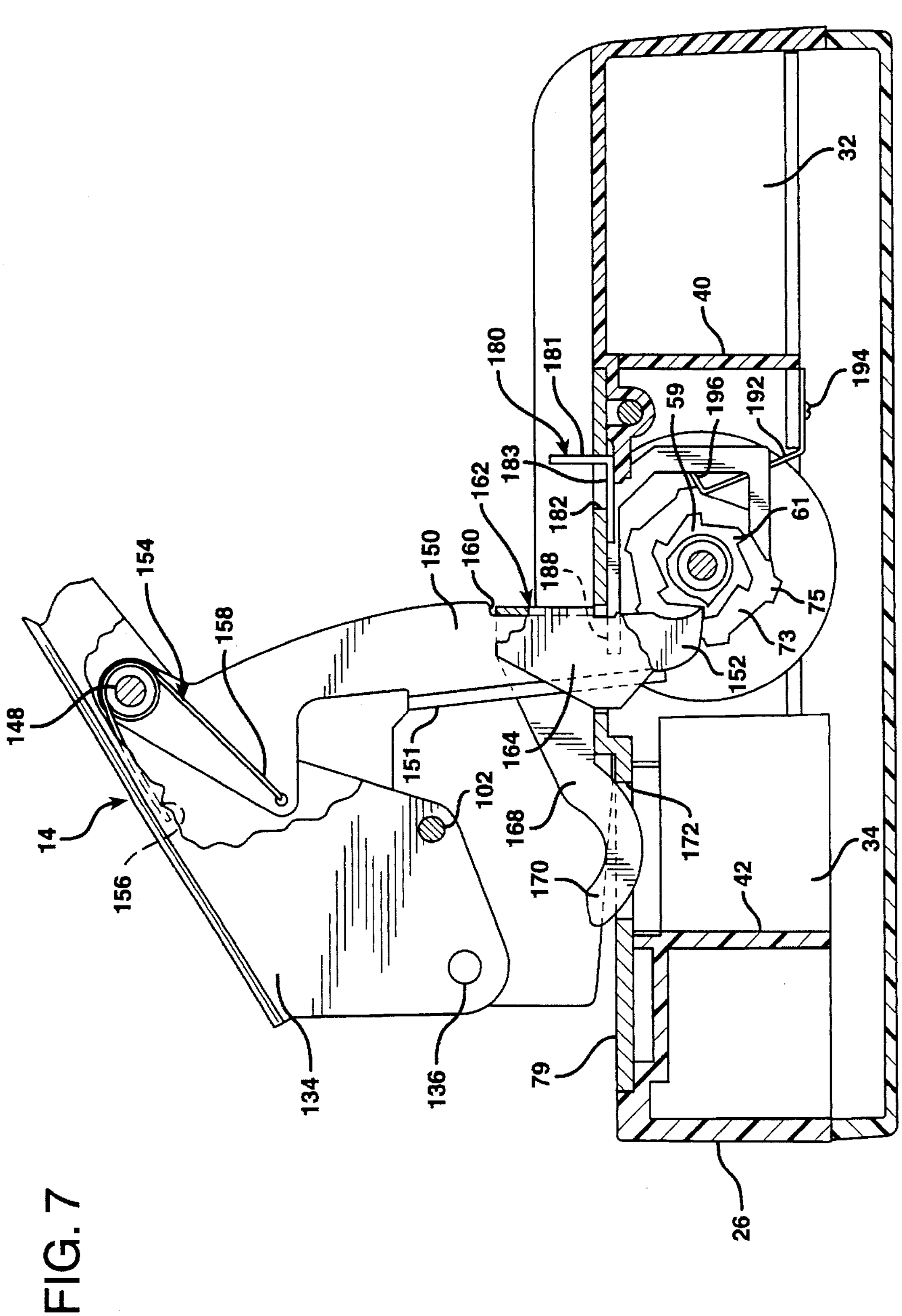
FIG. 7 is a sectional elevational view of the combination hole puncher and reinforcer taken along the lines 7—7 of FIG. 2 shown without a sheet of material to be punched inserted therein.
Figure 8:
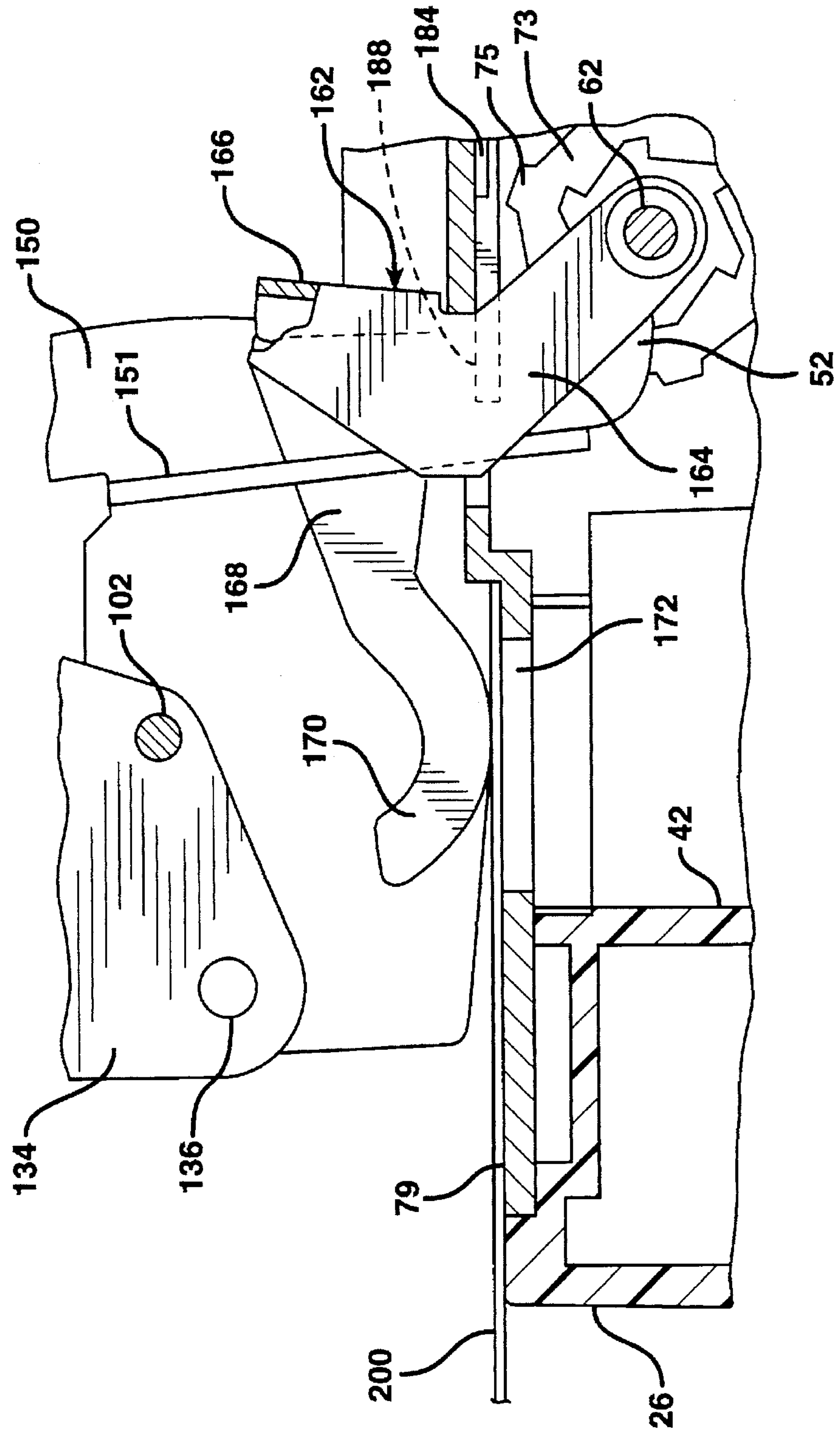
FIG. 8 is a sectional elevational detail of a portion of FIG. 7 shown with a sheet of material to be punched inserted therein and set to operate in both the punching and tape reinforcement modes.

Each sensor arm 168 extends forwardly and terminates in a convex, downwardly facing sensor finger 170, best illustrated in FIGS. 7 and 9. Each pawl interlock and guide 162 thereby forms a bell crank structure, freely mounted for rotation about the traction assembly axle 62. At the transition between the hinge plate arm 164, the engagement web 166, and the sensor arm 168, each pawl interlock and guide 162 has a U-shaped cross-section, as best illustrated in FIGS. 8, 9, and 10.

Since virtually all of the weight of each pawl interlock and guide 162 lies forward of the traction assembly axle 62, the sensor fingers 170 of the pawl interlock and guides 162 will normally reside resting within longitudinally oriented slots 172 defined in the metal plate 79 with the arcuate tips of the sensor fingers 170 extending above the level of the metal plate 79.

The pawl interlock and guides 162 are adjustable to carry each of the pawls 150 along a tape advancing ratchet engagement path of movement in which the pawl fingers 152 engage the teeth 61 of the tape advancing ratchet wheels 59. Each pawl interlock and guide 162 can also be adjusted independently to carry the pawl 150 associated therewith along an alternative path of movement in which the pawl finger 152 does not engage the ratchet teeth 61 of the tape advancement ratchet wheel 59.

As illustrated in FIG. 7, the pawls 150 are biased rearwardly by the springs 154 so that, unless deflected, they will travel along the tape advancing ratchet engagement paths of movement when the lever 14 is pushed downwardly toward the base 12. However, the pawls 150 can be rotated forwardly in a clockwise direction as illustrated in FIG. 9 by forces that overcome the biases of the springs 154. When this occurs the pawls 150 are rotated slightly in a clockwise direction about their axles 148. When forced forwardly in this manner the pawls 150 will follow the alternative path of movement in which they do not engage the ratchet teeth 61.

The puncher and reinforcer 10 includes a separate control switch 180 for each of the pawls 150. The control switches 180 are mounted side-by-side on the base 12 and are configured with transversely extending, vertically projecting control tabs 181 that are moveable longitudinally in a fore and aft direction within the confines of slots 182 defined in the deck 30. The control tabs 181 project upwardly above the deck 30 from flat, horizontally disposed slide plates 183 that are trapped and constrained for longitudinally reciprocal movement beneath the deck 30. The control tabs 181 project upwardly above the base 12 for reciprocal movement relative thereto.

The control switches 180 also include longitudinally aligned, generally U-shaped, vertically oriented control plates 186 that depend from the slide plates 183. Each of the control plates 186 includes a upper, forwardly extending arm 188 that passes above an associated traction drive assembly 54 and a lower, forwardly extending arm 190. The upper, forwardly extending arm 188 of each control plate 186 bears against the laterally extending bearing flange 151 of a longitudinally aligned one of the pawls 150.

When the slide tabs 181 are pushed forwardly, as illustrated in FIG. 9, the upper control plate arms 188 deflect the pawls 150 forwardly so that the pawl fingers 152 do not engage the tape advancement ratchet wheel teeth 61, but rather pass clear of the teeth 61 by passing forwardly thereof in arcuate paths as the punch operating lever 14 is depressed.

Alternatively, when the control tabs 181 are pushed rearwardly, as illustrated in FIG. 7, the bias of the springs 154 pushes the pawls 150 rearwardly to the extent permitted by the rearwardly withdrawn upper control arms 188. In this position a downward force on the punch operating lever 14 will cause the pawls 150 to move in a arcuate, downward path such that the pawl fingers 152 engage the next adjacent tooth 61 in the tape advancement ratchet wheel 59 so as to turn the ratchet wheel 59 through a counterclockwise arc, as viewed if FIGS. 3–8, and thereby advance further end sections of the lengths of tape 64 out over the die 81.

The pawl guide arm 188 is adjustable by moving the control tab 181 to its rearmost position to allow the associated pawl 150 to travel along a tape advancing ratchet engagement path of movement, as depicted in FIG. 7. With this adjustment the pawl tooth 152 engages the ratchet teeth 61 to advance the tape advancing ratchet wheel 59 in rotation in a counterclockwise direction when the punch 100 is moved in the vertically downward punching direction. The keeper pawl 196 normally prohibits clockwise rotation of the ratchet wheel 59. Alternatively, when the control tab 181 is pushed forwardly, as depicted in FIG. 9, the control arm 188 deflects the bearing flange 151 of the pawl 150 forwardly. This forces the pawl 150 to move along an alternative path of movement located forward of the tape advancement ratchet wheel 59, in which case the pawl finger 152 does not engage the ratchet teeth 61 of the tape advancement ratchet wheel 59 when the lever 14 is depressed.

The lower forwardly extending arm 190 of the pawl control plate 186 also forms a portion of the tape feed control mechanism. Specifically, the lower arm 190 terminates in a forwardly directed finger 195 that is reciprocally moveable relative to the mounting base 12. When the control tab 181 is pushed forwardly, the finger 195 engages one of the teeth 75 of the reversal restriction ratchet wheel 73 to rotate the traction drive assembly 54 in a clockwise direction, as viewed in FIGS. 3–9. This counter-rotates the traction disks 58, and pulls the severed edge of the tape 64 back slightly away from the gap 97 in which the blade plate 132 moves. The manual, forward force required to push the control tab 181 forwardly from the position of FIG. 7 to that of FIG. 9 is sufficient to overcome the bias of the metal strip 192 and allow the advancement ratchet wheel 59 to move in retrograde motion and to push past the keeper pawl 196.

To operate the puncher and reinforcer 10 the tape cavities 44 must first be loaded with rolls of tape 46. This is done by lifting the covers 68 with sufficient force to deflect the detent catches 84. The covers 68 are then rotated rearwardly, as depicted in FIG. 3. With the depression fingers 80 and idler rollers 78 drawn out of the way, as illustrated in FIG. 3, the tape cavities 44 are completely accessible.

The user then dislodges the spools 48 from the hollow cores of any spent rolls of tape. The spools 48 are then pushed into the hollow cores of fresh rolls of tape 46. The user then seats the stub axles 50 of the tape spools 48 in the slots 52 defined in the interior partitions 32, 34, 36, and 38 and seizes the accessible ends of the rolls of tape to draw off lengths of tape 64 from the tape rolls 46. The user withdraws long enough lengths of tape 64 to extend over the top centers of the traction disks 58.

The user then closes the covers 68. This causes the deflection fingers 82 and the idler rollers 78 to bear downwardly against the smooth uncoated sides 67 of the lengths of tape 64 both fore and aft of the traction assembly axle 62. This partially wraps the exposed lengths of tape 64 about the traction disks 58 and enhances tractional engagement between the traction disks 58 and the sticky sides 65 of the lengths of tape 64. The device is thereupon prepared for operation to both punch and reinforce thin sheets of material, such as the sheet of paper 200 illustrated in FIG. 8, or to merely punch the sheet of paper 200 without reinforcing it.

To operate the device in the mode for both punching and reinforcing sheets of material the user pushes the control tabs 181 rearwardly. If desired, the control tabs 180 can be operated independently of each other, though normally they will be operated in tandem. With the control tabs 181 pushed rearwardly, the control arms 188 are withdrawn rearwardly, thereby allowing the springs 154 to bias the pawls 150 rearwardly. Therefore, with each operation of the punch control lever 14, the pawl fingers 52 rotate the tape advancement ratchet wheels 59 through arcs of 60 degrees, while the punches 100 move vertically in the downward, punching direction through the dies 81.

In order for the punch lever 14 to be operated with the control tabs 181 pushed rearwardly to allow engagement of the tape feed mechanism it is necessary for a sheet of material 200 to be inserted in between the punch 100 and the die 81, as illustrated in FIG. 8. As the sheet of paper 200 is inserted it cams the punch sensor fingers 170 upwardly, in clockwise rotation, thereby rocking the punch interlock webs 166 to the rear in rotation about the traction drive axle 62. This pushes the pawl interlock webs 166 out of alignment with the notches 160 in the pawls 150. Therefore, the interlock webs 166 will not engage the rear edges of the pawls 150 at the notches 160 therein. This allows the pawls 150 to move along their tape advancing ratchet engagement paths depicted in FIG. 7.

On the other hand, in the absence of sheet of paper 200 atop the dies 81, the sensor fingers 170 will drop into the slots 172 in the plate 79. The pawl interlock and guide assemblies 162 will thereupon rotate forwardly in a counterclockwise direction under the force of gravity to the position shown FIG. 9. The punch operating lever 14 is thereby obstructed in its movement along the tape advancement ratchet engagement path since the notches 160 in the rear edges of the pawls 150 engage the interlock webs 66 of the pawl guide and interlock devices 162. This prevents tape from being fed forwardly through the longitudinal tape paths 94 and thereby prevents sections of tape from being severed and adhesively engaged onto the upper surface of the dies 81.

With the sheet of paper 200 in the punching position shown in FIG. 8, initially it may take several strokes of the punching operating lever 14 to advance enough tape through the longitudinal paths 94 to reach registration with the dies 81. As the lengths of tape 64 are advanced with successive strokes of the punch operating lever 14, the tape is drawn by the tractional engagement of the sticky sides 65 thereof with the traction disks 58 forwardly off of the rolls of tape 46. The force of the depression fingers 80 and the idler rollers 78 on the smooth, uncoated sides 67 of the lengths of tape 64 aids in creating the necessary tractional engagement to draw the tape off of the rolls of tape 46. The guide disks 56 aid in ensuring that the lengths of tape 64 travel along their prescribed longitudinal paths by providing lateral constraints that maintain the lengths of tape 64 in longitudinal alignment.

Figure 12:
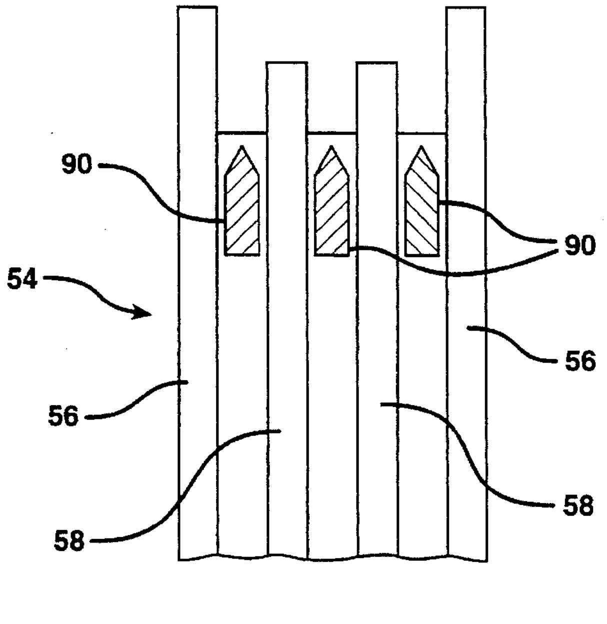
FIG. 12 is a transverse sectional elevational detail taken along the lines 12—12 of FIG. 3.
Figure 11:
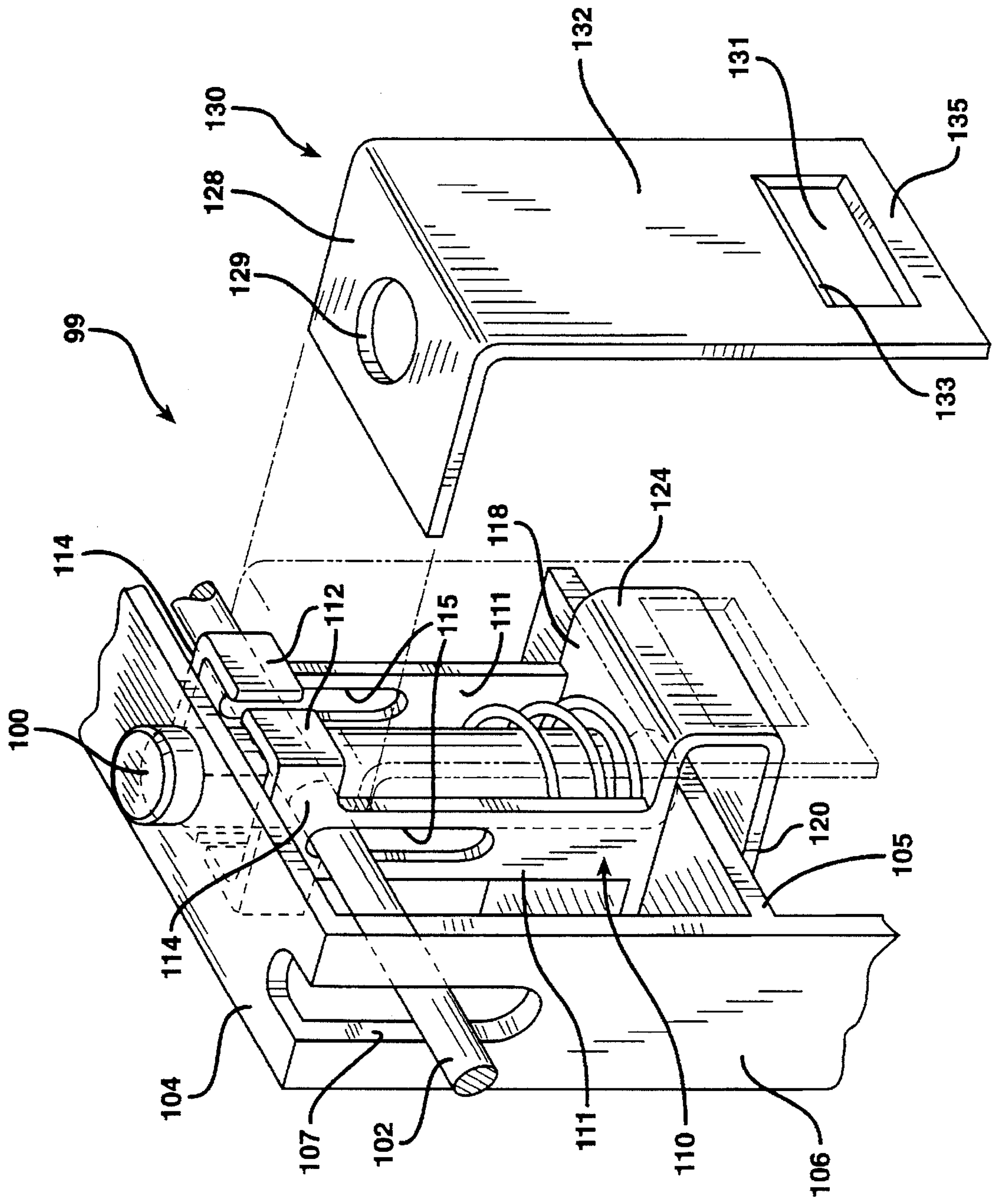
FIG. 11 is an exploded perspective detail illustrating one of the punch assemblies.

As the forward ends of the lengths of tape 64 arrive at the upwardly curved tips of the guide fingers 90, they are peeled from the traction disks 58 by the very narrow, lines of contact which the undersides 65 of the tape make at the apices 91 of the guide fingers 90, as illustrated in FIG. 12. Together the guide fingers 90 acting against the sticky undersides 65 of the lengths of tape 64 and the depending flanges 92 acting against the smooth, top sides 67 thereof direct the lengths of tape 64 longitudinally forwardly through the longitudinal paths 94 between undersides 86 of the punch mounting brackets 18 and the knife edge ridges of the guide fingers 90.

With each operation of the punch lever 14, the transverse punch carriage rods 102 are pushed downwardly due to their engagement in the ears 134 of the punch operating lever 14 rearwardly of the punch lever axles 136. The initial downward force of the punch carriage rods 102 forces the blade flanges 128 downwardly, thereby compressing the springs 126 beneath the horizontal blade flanges 128 of the blade assemblies 130. This downward force also carries the press plate carriages 110 vertically downwardly from the positions depicted in FIG. 4 to the position depicted in FIG. 5.

At this point the sections of the lengths of tape 64 that have been feed out forwardly past the tape support 96 into registration with the dies 81 and the punches 100 are pressed downwardly onto the upwardly facing surface of the sheet of paper 200. Since the sticky sides 65 of the lengths of tape 64 face downwardly, the sections of lengths of tape 64 extending forwardly beyond the gap 97 are adhesively secured to the upper surface of the sheet of paper 200 once the punch 100 has been moved vertically downwardly to the extent illustrated in FIG. 5.

Since at this point the pressure plates 120 of the pressure plate carriages 110 resides in contact with the upper surfaces 67 of the lengths of tape 64 and with the surrounding areas of the upper surfaces of the sheet of paper 200, the pressure plate carriages 110 cannot move any further downwardly. However, the punch 100 is carried further vertically downwardly through the openings defined in the horizontal plates 118 and through the openings defined in the pressure plates 120 by further compression of the spring 126. As the lower ends of the punches 100 move vertically downwardly past the pressure plates 120, they punch out disks 202 formed of a layer of the end sections of the lengths of tape 64 atop circular pieces of the paper 200. The waste disks 202 fall downwardly into the tray 20 where they are collected for disposal.

Concurrently with the punching action of the punch 100, the blade edges 133 of the blade assemblies 130 cross the longitudinal paths of tape advancement 94 as the lengths of tape 64 are fed through the rectangular windows 131 in the blade assemblies 130 at an elevation very slightly above the transverse lifting structures 135 of the blade plates 132. As the punches 110 move downwardly, the punch carriage rods 102 press downwardly on the blade flanges 128, thereby forcing the blade plates 132 vertically downwardly. Near the termination of the downward stroke shown in FIG. 6, the blade edges 133 sever the end sections of the lengths of tape 164 that protrude past the tape support 96 into the gaps 97.

As the punch operating lever 14 is released, the coil springs 126 first push the blade assemblies 130 vertically upwardly by virtue of force applied against the underside of the blade plates 128. This also forces the punches 100 vertically upwardly due to the forces transmitted thereto through the transverse punch carriage rods 102. Once the springs 126 have relaxed to the position depicted in FIG. 5, they will thereafter carry the pressure plate carriages 110 vertically upwardly as well until the ears 112 of the channel-shaped upper potions thereof are pressed into abutment against the undersides of the upper platforms 104 of the punch mounting brackets 18.

At this point the pressure plates 120 have been forced vertically upwardly as well, clear of the longitudinal paths 94 of tape feed. This allows the next downward force on the punch operating lever 14 to rotate the tape advancement ratchet wheels 59 through engagement of the pawl fingers 152 with the tape advancement rachet teeth 61 before the pressure plates 120 are moved vertically downwardly into the plane of the end sections of the lengths of tape 64 that have been advanced out over the die 81 above the level of the paper 200.

As the tape lifting structures 135 rise during the returned stroke of the punches 100, they press upwardly on the undersides 65 of the severed extremities of the lengths of tape 64 and lift the lengths of tape 64, thereby breaking any adhesive bond between the lengths of tape 64 and the tape support 96. This raises the severed ends of the lengths of tape 64 sufficiently so that with the next advancement of the tape advancement ratchet wheel 59, end sections of the lengths of tape 64 will be fed out over the next sheet of paper 200 to be reinforced at a level vertically separated therefrom so that premature contact between the advancing lengths of tape 64 and the upper surface of the sheet of paper 200 is avoided.

As previously noted, the device 10 can be operated in a punch only mode in which no tape is advanced from the rolls of tape 46. Operation in this mode is achieved by pressing the control tabs 181 forwardly to the position depicted in FIG. 9. When operated in this mode the punch 100, blade assemblies 130, and pressure plate carriages 110 will all be operated by the punch lever 14 in the manner previously described. However, since the pawls 150 pass forwardly of the ratchet wheels 59, the fingers 152 of the pawls 150 do not engage the teeth 61 of the ratchet wheels 59. The traction drive mechanisms 54 are therefore not engaged and no tape is fed out beyond the tape support 96.

It should be noted that with the movement of the control tabs 181 from the rearward position of FIG. 7 in which the device 10 is operated in both the punching and reinforcement mode to the forward position depicted in FIG. 9 in which it is operated in the punching mode only, the fingers 194 of the lower arms 190 of control plates 186 engage teeth 61 on the tape advancement ratchet wheel 59. This overcomes the bias of the keeper pawls 96 and rotates the traction drive assemblies 54 in a retrograde, clockwise direction, thereby withdrawing the severed ends of the tape 64 out of the gaps 97. This prevents the next downward stroke of the blade plate 132 from frictionally engaging the severed ends of the lengths of tape 64 and carrying them downward to where they might stick on to the tape support 96 and thereupon become fouled.

Undoubtedly, numerous variations and modifications of the invention will become readily apparent to those familiar with punching and reinforcing devices. For example, either of the alternative punch assemblies depicted and described in my prior U.S. Pat. No. 4,826,561 could be substituted for that illustrated and described herein. Accordingly, the scope of the invention should not be construed as limited to the specific embodiments illustrated and described.

I claim:

1. In a combination hole puncher and reinforcer including an adhesive tape feed mechanism for feeding a section of a length of tape into aligned registration over an edge of a flat sheet of material to be punched, a punching device for punching an aperture through said section of said length of said tape and through said flat sheet, and a tape feed control mechanism for selectively enabling and disabling said adhesive tape feed mechanism, the improvement comprising a punch control mechanism for detecting the presence of a flat sheet of material in registration with said punching device and providing a mechanical interlock for disabling said punching device in the absence of such a flat sheet in registration therewith unless said adhesive tape feed mechanism is disabled.

2. A combination according to claim 1 wherein said punch control mechanism is comprised of a gravity operated latch which is lifted by the insertion of a flat sheet of material into registration with said punching device to allow operation of said punching device and which otherwise drops to obstruct operation of said punching device when said tape feed control mechanism has enabled said adhesive tape feed mechanism.

3. In a combination according to claim 1 having a base and in which said adhesive tape has a sticky side coated with pressure sensitive adhesive and an opposite uncoated side, the further improvement wherein said adhesive tape feed mechanism resides within a cavity in said base and is comprised of a plurality of laterally separated traction drive disks coaxially supported by said base for rotation relative thereto about a traction drive axis, and a tape retainer carrying an idler roller and a depression finger, and wherein said tape retainer is hinged for rotation to said base and is movable between an open position exposing said cavity to provide access for replenishing said adhesive tape and a closed position in which said idler roller and said depression finger bear against said uncoated side of said adhesive tape on opposite sides of said traction drive axis so as to wrap said adhesive tape partially about said traction drive disks with said adhesive coated side thereof pressed thereagainst so as to enhance traction between said traction drive disks and said adhesive tape.

4. A combination according to claim 1 wherein said tape feed control mechanism includes a means for backing said length of tape away from said punching device when said tape feed control mechanism is operated to disable said tape feed mechanism.

5. In a hole punching and reinforcing device in which a hole punching mechanism and adhesive tape feed mechanism are mounted on a base and are interconnected to feed adhesive tape having a sticky side coated with pressure sensitive adhesive and an opposite uncoated side from a roll of tape disposed in a tape supplying cavity in said base into registration with said hole punching mechanism and to punch a flat sheet of material while reinforcing it with a length of said adhesive tape, and in which said tape feed mechanism is comprised of a traction drive assembly including a plurality of coaxially mounted, laterally separated traction disks upon the edges of which said sticky side of said tape is tractionally engaged, the improvement comprising a cover over said tape supply cavity hinged to said base, and an idler roller mounted on said hinged cover wherein said hinged cover is rotatable between an open position exposing said roll of tape and at least a portion of said traction disks to allow replacement of said roll of tape, and a closed position in which said idler roller bears against said uncoated side of said tape to increase the extent of contact of said sticky side of said tape with said traction disks.

6. In a hole punching and reinforcing device in which a hole punching mechanism and adhesive tape feed mechanism are mounted on a base and are interconnected to feed adhesive tape having a sticky side coated with pressure sensitive adhesive and an opposite uncoated side from a roll of tape disposed in a tape supplying cavity in said base into registration with said hole punching mechanism and to punch a flat sheet of material while reinforcing it with a length of said adhesive tape, and in which said tape feed mechanism is comprised of a traction drive assembly including a plurality of coaxially mounted, laterally separated traction disks upon the edges of which said sticky side of said tape is tractionally, engaged, the improvement wherein said tape feed mechanism is further comprised of a pair of guide disks laterally separated a distance greater than the width of said adhesive tape and coaxially mounted and coupled for rotation with said traction drive disks, wherein said traction disks are located between said guide disks and wherein said guide disks have a diameter greater than that of said traction disks and aid in directing said adhesive tape toward said hole punching mechanism.

7. In a hole punching and reinforcing device in which a hole punching mechanism and adhesive tape feed mechanism are mounted on a base and are interconnected to feed adhesive tape having a sticky side coated with pressure sensitive adhesive and an opposite uncoated side from a roll of tape disposed in a tape supplying cavity in said base into registration with said hole punching mechanism and to punch a flat sheet of material while reinforcing it with a length of said adhesive tape, and in which said tape feed mechanism is comprised of a traction drive assembly including a plurality of coaxially mounted, laterally separated traction disks upon the edges of which said sticky side of said tape is tractionally engaged, a tape advancing ratchet wheel coupled to rotate said traction disks in tandem, and a pawl coupled to said punching mechanism to advance said tape advancing ratchet wheel in a tape advancement direction of rotation with operation of said punching mechanism, the improvement comprising a tape feed control mechanism for selectively enabling and disabling said adhesive tape feed mechanism wherein said tape feed control mechanism is comprised of a pawl spring biasing said pawl toward said tape advancing ratchet wheel and a switch mounted on said base for movement relative thereto, said switch being operable to overcome the bias of said pawl spring to thereby force said pawl toward a disengaged path of movement in which said pawl cannot engage said tape advancing ratchet wheel.

8. In a combination hole puncher and reinforcer including an adhesive tape feed mechanism for feeding a section of a length of tape into aligned registration over an edge of a flat sheet of material to be punched and which includes a blade for severing said section of tape from the remainder of said length of tape, thereby leaving said remainder of said length of tape with a severed end, a punching device for punching an aperture through said section of said tape and said flat sheet, and a tape feed control mechanism for selectively enabling and disabling said adhesive tape feed mechanism, the improvement wherein said adhesive tape feed mechanism includes a device that lifts said severed end of said length of tape above the level of said flat sheet of material.

9. In a combination hole puncher and reinforcer including a punch mechanism and an adhesive tape feed mechanism for feeding a section of a length of tape having a sticky side coated with pressure sensitive adhesive and an opposite uncoated side into aligned registration over an edge of a flat sheet of material to be punched and reinforced and including a plurality of coaxially mounted, laterally separated traction disks upon the edges of which said sticky side of said tape is tractionally engaged and which are rotatable in a tape advancement direction of rotation, and a punch and reinforcement selection mechanism for selectively enabling both said punch mechanism and said adhesive tape feed mechanism and alternatively disabling said adhesive tape advancement mechanism without disabling said punch mechanism, the improvement wherein said punch and reinforcement selection mechanism includes a gravity operated interlock that is lifted by insertion of said flat sheet of material into registration with said punching mechanism, thereby allowing said punch and reinforcement selection mechanism to enable both said punch mechanism and said adhesive tape feed mechanism and which otherwise drops under the force of gravity, thereby allowing said punch and reinforcement selection mechanism to enable only said punch mechanism.

10. A combination according to claim 9 wherein said punch and reinforcement selection mechanism includes means for counterrotating said traction disks when operated to disable said adhesive tape advancement mechanism without disabling said punch mechanism to thereby withdraw said length of tape from said punch mechanism.

11. In a hole punching and reinforcing device including a hole punching mechanism having a die defining a punching aperture therein and a punch reciprocally movable through said punching aperture in opposite punching and withdrawal directions, and including an adhesive tape feed mechanism, and in which said punching mechanism and said adhesive tape feed mechanism are interconnected to advance a section of a length of adhesive tape having a sticky side coated with pressure sensitive adhesive thereon so that said sticky side of said section of tape resides in registration facing said die with a flat sheet of material to be punched located between said sticky side of said adhesive tape and said die, and including a tape support facing said length of tape and located adjacent said die and separated from said die by a gap defined therebetween, and a blade coupled to said punch to move through said gap to sever said section from the remainder of said length of adhesive tape when said punch moves in said punching direction, the improvement comprising a lifting mechanism coupled to said blade to lift said sticky side of said remainder of said length of tape away from said tape support as said punch moves in said withdrawal direction.

12. A combination hole puncher and reinforcer comprising:

a mounting base defining a linear channel of tape travel, at least one tape supply cavity formed in said mounting base to accommodate a roll of tape therewithin having an uncoated side and an opposite sticky side coated with pressure sensitive adhesive, at least one traction drive assembly supported for rotation in said mounting base about a traction drive assembly axis, and including a pair of laterally separated guide disks of equal diameter between which tape is drawn from said roll of tape and directed toward said linear channel of tape travel, and a plurality of laterally separated traction disks coaxially mounted between said guide disks for contacting and supporting said sticky side of said tape, said traction disks having a uniform diameter less than that of said guide disks, a movable tape cavity cover carrying an idler roller and a depression finger and positionable relative to said mounting base such that said idler roller bears against said tape on said uncoated side thereof between said tape roll and said traction drive assembly and said depression finger bears against said tape on said uncoated side thereof beyond said traction drive assembly axis so as to force said sticky side of said tape against said traction disks over arcuate portions of the circumferences thereof to thereby enhance traction between said traction disks and said sticky side of said tape, a tape advancing ratchet wheel coupled to said traction drive assembly and having ratchet teeth engagable to rotate said traction drive assembly in a tape advancing direction to draw tape off said roll of tape, a guide mounted on said base beneath said sticky side of said tape and beyond said traction drive assembly axis so as to deflect said tape from said traction disks into said linear channel, a punch operating lever rotatably joined to said mounting base, at least one punch operable connected to said punch operating lever and mounted on said base for reciprocal movement relative thereto in a punching direction and in an opposite return direction along a path of punch travel that intersects said linear channel of tape travel, a die on said mounting base located below said linear channel of tape travel and oriented perpendicular to said punch and having an opening therethrough coaxially aligned with said punch and through which said punch passes, a blade assembly engaged with said punch for reciprocal movement therewith and including a blade transversely oriented relative to said linear channel of tape travel and located longitudinally between said die and said guide and reciprocally movable through said linear channel of tape travel, a tape lifting member located beneath said linear channel of tape travel and coupled to said blade for movement therewith to bear upwardly against said sticky side of said tape during movement of said punch in said return direction, a pawl coupled to said punch operating lever, a pawl guide that is adjustable to carry said pawl along a tape advancing ratchet engagement path of movement in which said pawl engages said ratchet teeth to advance said tape advancing ratchet wheel in rotation when said punch moves in said punching direction and alternatively to carry said pawl along an alternative path of movement in which it does not engage said ratchet teeth of said tape advancement ratchet wheel, a control for selectively adjusting said pawl guide to direct movement of said pawl along said tape advancing ratchet engagement path and said alternative path, and a pawl interlock that prevents movement of said pawl along said tape advancing ratchet engagement path when said control directs movement of said pawl along said tape advancing ratchet engagement path unless a sheet of material to be punched and reinforced resides in said path of punch travel.

13. A combination according to claim 12 in which said pawl interlock is comprised of a gravity operated latch that is lifted by the insertion of a sheet of material into registration with said punch and said die to permit movement of said pawl along said tape advancing ratchet engagement path when said control directs movement of said guide thereal-ong.

14. A combination according to claim 12 in which said control is comprised of a manually operated slide switch mounted on said base for reciprocal movement relative thereto.

15. A combination according to claim 12 wherein said control includes a means for counterrotating said traction drive assembly when said control is operated to adjust said pawl guide to direct movement of said pawl along said alternative path.

* * * * *